Figure 1:
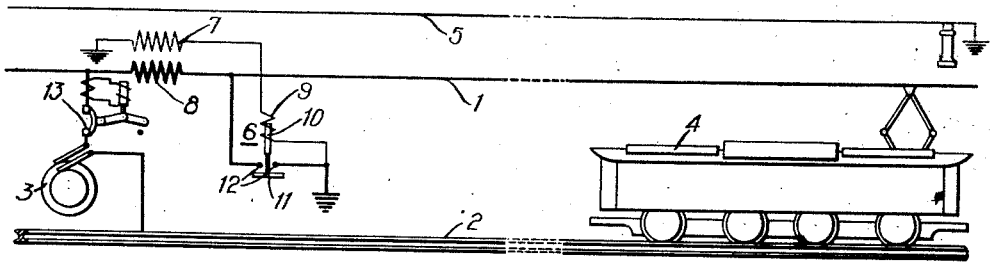

Nov. 13, 1923.

C. F. SCOTT 1,473,881

NONINDUCTIVE INTERFERENCE SYSTEM

Filed Dec. 2, 1918

INVENTOR
Charles F. Scott.

Patented Nov. 13, 1923.

1,473,881

UNITED STATES PATENT OFFICE.

CHARLES F. SCOTT, OF NEW HAVEN, CONNECTICUT, ASSIGNOR TO WESTINGHOUSE ELECTRIC & MANUFACTURING COMPANY, A CORPORATION OF PENNSYLVANIA.

NONINDUCTIVE INTERFERENCE SYSTEM.

Application filed December 2, 1918. Serial No. 264,939.

*To all whom it may concern:*

Be it known that I, CHARLES F. SCOTT, a citizen of the United States, and a resident of New Haven, in the county of New Haven and State of Connecticut, have invented a new and useful Improvement in Noninductive Interference Systems, of which the following is a specification.

My invention relates to means for preventing excessive currents in transmission systems and is particularly related to the prevention of the excessive current which is liable to flow in an electric circuit when a short circuit occurs.

My invention may, therefore, be employed as a means for preventing inductive interference between an electrical distributing system and an independent electrical conductor in proximity thereto, and it has special relation to the means for preventing the induction of high values of electromotive forces in independent electrical conductors when a short circuit or other abnormal current condition exists in a power conductor in proximity to such independent electrical circuits.

It has been found that, when a short circuit occurs, for example, at the end of a single-phase electrical railway, the large current flowing in the trolley and returning by the track and earth circuits may induce an abnormally high voltage in adjacent intelligence-transmission circuits. In such cases the initial current is liable to be momentarily greater than that which may persist after the first impulse. While numerous methods have been proposed for preventing the induction of such undesirable voltages, it has been found that the usual means employed are incapable of responding quickly enough to such violent fluctuations of the current in the distribution system to prevent the undesirable high values of induced electromotive force in the circuits positioned parallel with said transmission circuits. The conditions contemplated are particularly those of circuits in which there is a tendency for abnormally great current to flow.

By means of my present invention, I propose to bring the current-interrupting devices into action to stop the increase of current in the trolley circuit when the induced voltage in the parallel independent electrical conductor reaches a predetermined value. Such action must occur very quickly, since the induced voltage through half a cycle may reach a value far in excess of what the desired limit of such voltage should be. It is desirable, therefore, to bring about a relief of the abnormal conditions existing in the transmission system within a fraction of a half cycle, and it is obvious that, with the methods now in use, it is not practicable to obtain such a result, this requirement being quite beyond that of any practicable circuit-opening device.

Circuit-interrupting devices, as commonly made, are dependent upon excessive current for their operation, the actuation of the device occurring after the high value has been reached, and the current is not interrupted until an appreciable interval of time has occurred. Hence, the interruption of the current by an ordinary circuit-interrupting device occurs after the initial excess current may have caused the induction of a high electromotive force in the adjacent circuit.

By means of my present invention I propose to anticipate the excess current and to interrupt the current in as short a time as possible, preferably before the high value of the current has been reached. I do not depend, therefore, upon the actual excess-current value, but rather upon the rate of rise in the value of the current. If the current begins to increase at a rapid rate, it indicates that it will probably reach a high maximum value. The rapid rise of current causes an electromotive force to be induced in any secondary circuit or coil placed in inductive relation to the current in the transmission circuit and this electromotive force is made the actuating force in the interruption of the current.

The principle involved, therefore, is the employment of the electromotive force induced in a secondary circuit for producing the initial action of the interrupting device, instead of employing the current itself and, since this electromotive force depends upon the rate of rise of current, it comes into action while the current itself may still be of small value, instead of depending upon the direct action of the current itself, in which case no action would occur until a high value of the current had been attained.

It may be noted that the secondary electromotive force induced in a coil in the station which acts upon the circuit-interrupting device is of the same nature as the electromotive force induced in the secondary circuits constituted by the parallel intelligence-transmission circuits outside the station. Hence, when the conditions are such that the electromotive force in the intelligence-transmission circuit reaches a high value, there is also a corresponding electromotive force in the secondary coil which, in turn, brings into action the means for interrupting the circuit.

An additional feature of the invention is the provision of one novel means for utilizing the rise of voltage in the secondary circuit to interrupt the current in the circuit.

I have, therefore, provided means in connection with such distribution systems for actuating the devices to relieve the abnormal conditions which may exist thereon due to a short circuit, which means will operate within a small fraction of a half cycle or, practically instantaneously.

I also propose means whereby the electromotive force induced in the secondary coil may cause the current in the transmission circuit to be interrupted.

Briefly, I propose to connect, between the trolley conductor and the ground, a spark gap which will be energized in proportion to, and in synchronism with, a disturbing influence which causes an abnormal current to flow in the distribution system, which current tends to induce, in an adjacent independent conductor, the aforesaid undesirable high voltage. With such spark-gap means, I intend to associate means for disrupting the same when the above-mentioned conditions exist in the distribution system.

While I have shown, in the majority of the figures, a spark gap as the short-circuiting device, to which the current will be diverted from the distribution circuit, it is to be understood that many other devices such, for instance, as a quick acting switch, could be used to accomplish the short-circuiting operation. Since, however, I believe that the use of a spark gap in this connection is wholly new, I have purposely emphasized this means in the ensuing description and claims.

Figure 2:
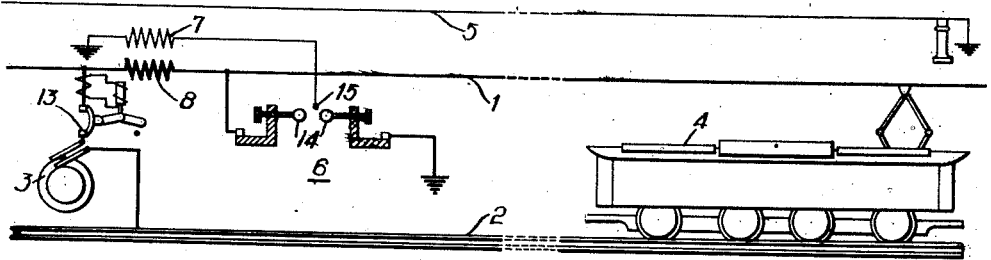
Figure 3:
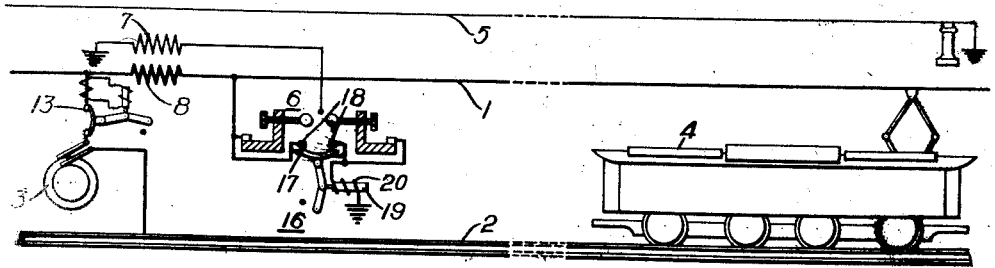
Figure 4:
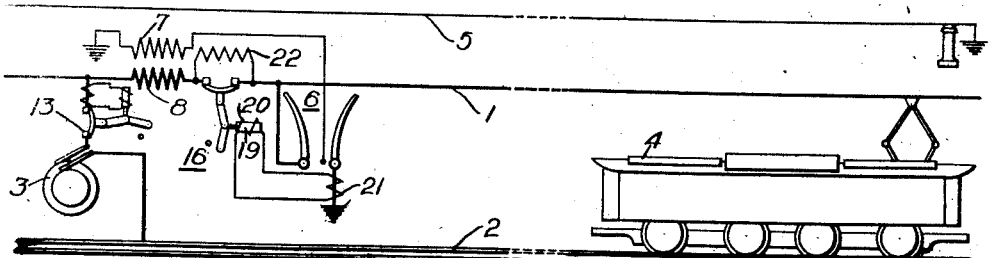

For a better understanding of my invention, reference may be had to the accompanying drawing, in which:

Fig. 1 is a diagrammatic view of the connections used in associating my inductive interference-preventing means with an electrical distribution system; while Figs. 2, 3 and 4 are modifications of the system shown in Fig. 1.

Referring more specifically to Fig. 1, an electrical distribution system, shown here, for example, as a single-phase railway system, is represented by a trolley wire 1 and a track 2, the system deriving energy from an alternator 3. A locomotive 4 is shown operating on the electrical railway system. Disposed in proximity to the trolley conductor 1 and the track circuit 2, is an intelligence-transmission circuit 5.

A short-circuiting means 6 is connected between the trolley conductor 1 and the ground, and has associated therewith a coil 7 both terminals of which are connected, through suitable leads, to the ground.

The coil 7 is disposed in proximity to a coil 8 which carries the trolley current and it will be noted, therefore, that the coil will be acted upon by the same inductive influence as that which tends to act upon the circuit 5.

As shown, for convenience of illustration, the short-circuiting means 6 comprises an actuating coil 9 surrounding an armature 10 to which is attached a switch member 11. The member 11 engages terminals 12—12, thereby connecting the line 1 to the ground. A circuit-opening device 13 is provided to open the generator circuit after the main current-diverting device 6 has operated. This circuit-breaking device is energized by the excessive current passing through the generator and will, therefore, operate subsequent to the spark-gap disruption to cut the generator out of the circuit in which the excessive current is flowing.

In Fig. 2, the short circuiting means 6 comprises a spark gap device having the two sphere members 14 and a pilot-spark sphere 15. The pilot-spark gap is energized by the coil 7 and will, therefore, cause disruption of the main gap upon the induction of the required voltage in the coil 7.

In Fig. 3 I have shown additional means for suppressing the disturbances which may give rise to induction interference. Here I have shown a circuit-closing device 16 consisting of a member 17 which bridges terminal points 18 of the main spark gap and an armature 19 which is surrounded by an energizing coil 20. The coil 20 is in series-circuit relationship with the pilot spark gap as well as the main spark gap. Therefore, upon disruption of the main gap, the circuit-closing device will bridge the terminals 18, and the excessive current may thereafter flow through this path without possibility of the spheres being unduly burned.

In Fig. 4 a somewhat different arrangement of the elements embodying my invention is shown. Here the spark gap is shown as of the horn type. The device 16 is here arranged to insert a resistance in the main transmission-line circuit in response to a current flowing through the disrupted gap, the coils 20 and 21 operating to perform this function. It will be noted that, when the device 16 opens the main-line circuit, a resistance member 22 is placed across the opening which assists materially in consuming the excess energy which is present so that the other devices such as 13 for finally opening the circuit may operate at a materially reduced current.

Having described my invention as embodied in a number of different modifications, the operation thereof, as embodied in the system shown in Fig. 1, is as follows:

The electromotive force induced in the coil 7 by the rapidly rising current in the trolley circuit, which is proportional to the electromotive force tending to be induced in the independent electrical circuit, will actuate the circuit-closing means to connect the trolley conductor 1 to the ground. This will operate to eliminate the current in the transmission circuit and thereby remove the abnormal conditions which tend to cause the undesirable interference.

In those figures in which I have shown the circuit-closing means as comprising a spark gap, the operation will be somewhat different. When the proper voltage is induced in the coil 7, a spark will pass at the pilot spark gap, and this, in turn, will ionize the space between the main spheres, and the main gap will thereafter be disrupted. This will cause a short circuit to exist between the trolley wire 1 and the ground, and the abnormal conditions will be eliminated, in the manner hereinbefore described.

Again, it will be noted that the additional circuit-closing, and breaking, apparatus which I have shown, as associated with my main circuit-closing means in some of the modifications, have the function of further preventing a continuation of the induction of undesirable electromotive forces in the independent intelligence-transmission circuit.

While I have shown several modifications of my system, it is obvious that many changes may occur to those skilled in the art and I intend, therefore, only such limitations to be placed thereon as are imposed by the prior art or are specifically set forth in the appended claims.

I claim as my invention:

1. The combination with an electrical distribution system, and a conductor of an independent electrical circuit in proximity thereto, of spark-gap means associated therewith for preventing the induction of undesirable potentials in said independent electrical circuit when abnormal conditions exist in said electrical distribution system.

2. The combination with an electrical distribution system, and a conductor of an independent electrical circuit in proximity thereto, of spark-gap means so dynamically associated with said electrical distribution system and the ground that an abnormal condition on said electrical distribution system is immediately relieved by the disruption of said gap.

3. The combination with an electrical distribution system, and a conductor of an independent electrical circuit in proximity thereto, of a main spark-gap and a pilot gap associated therewith, and means associated with said spark gaps to cause the pilot gap to initially break down said main gap upon the occurrence of abnormal conditions in said electrical distribution system.

4. The combination with an electrical distribution system, and a conductor of an independent electrical circuit in proximity thereto, of a main spark-gap and a pilot gap associated therewith and means associated with said gaps for causing the pilot gap to initially break down said main gap upon the occurrence of abnormal conditions in said electrical distribution system, said pilot-gap being energized by, and in synchronism with, the rate of change of the currents flowing in said electrical distribution system when said abnormal conditions obtain therein.

5. The combination with an electrical distribution system, and a conductor of an independent electrical circuit in proximity thereto, of a spark-gap, and a conductor so disposed in inductive relationship to said electrical distribution system and so associated with said spark gap that the latter is disrupted substantially in synchronism with the occurrence of abnormal conditions in said electrical distribution system.

6. The combination with an electrical distribution system, and a conductor of an independent electrical circuit in proximity thereto, of a spark-gap associated therewith, an auxiliary conductor so disposed in proximity to said electrical distribution system that a voltage is induced therein proportional to that which is induced in said independent electrical circuit by abnormal currents flowing in said electrical distribution system, and means so associating said spark-gap and said auxiliary conductor that the spark gap is disrupted when said abnormal current conditions obtain in said electrical distribution system, whereby inductive interference with said independent electrical circuit is prevented.

7. The combination with an electrical distribution system, and a conductor of an independent electrical circuit in proximity thereto, of a main spark gap, means for initially disrupting said main spark gap, and an auxiliary conductor in proximity to said electrical distribution system and said independent electrical circuit, said auxiliary conductor being so positioned that a voltage is induced therein proportional to that induced in said independent electrical circuit by abnormal currents in said electrical distribution system.

In testimony wherof, I have hereunto subscribed my name this 20th day of Nov. 1918.

CHARLES F. SCOTT.